No. 637,893. Patented Nov. 28, 1899.
J. P. PERKINS.
ICE CREAM FREEZER.
(Application filed Nov. 10, 1897.)
(No Model.) 2 Sheets—Sheet 1.
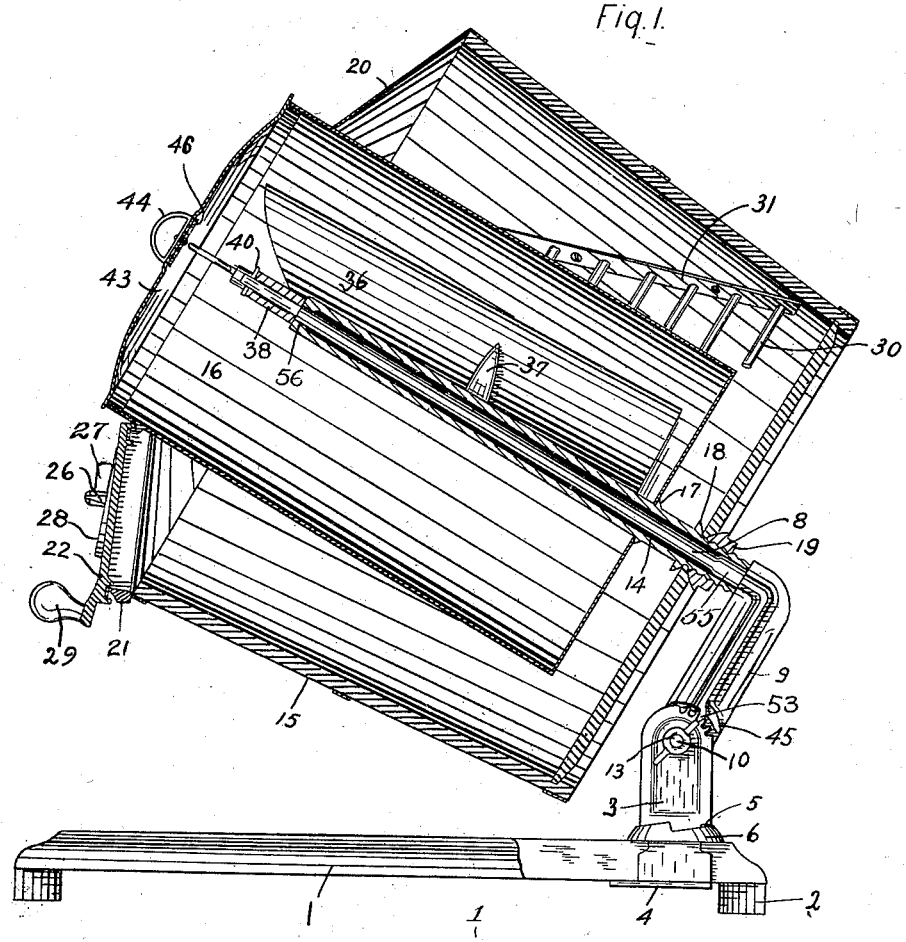
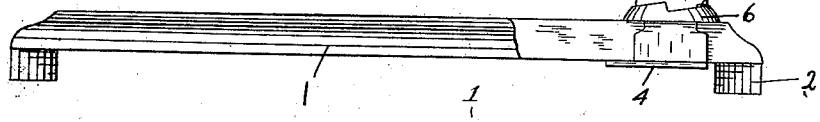
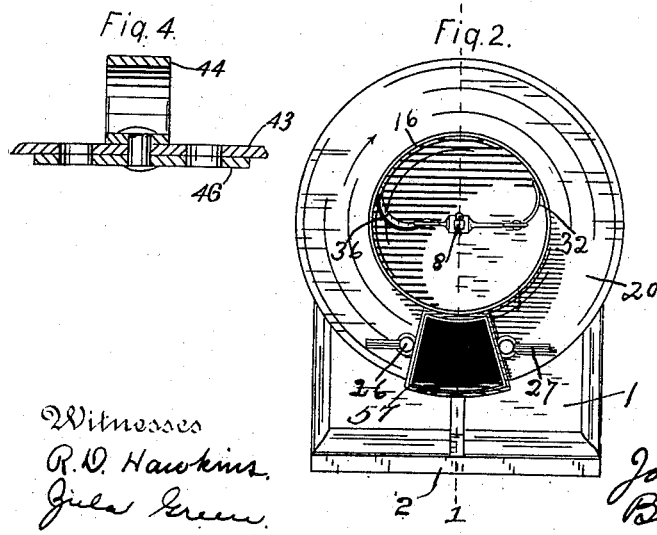
Witnesses
R. D. Hawkins
Jula Green
Inventor
Josiah P. Perkins
By V. H. Lockwood
His Attorney.
THE NORRIS PETERS CO., PHOTO-LITHO., WASHINGTON, D. C.

No. 637,893. Patented Nov. 28, 1899.
J. P. PERKINS.
ICE CREAM FREEZER.
(Application filed Nov. 10, 1897.)
(No Model.) 2 Sheets—Sheet 2.
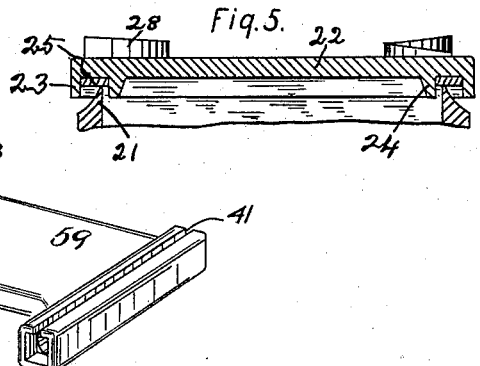
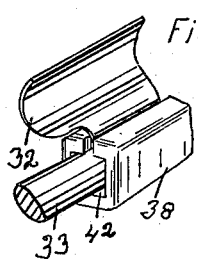
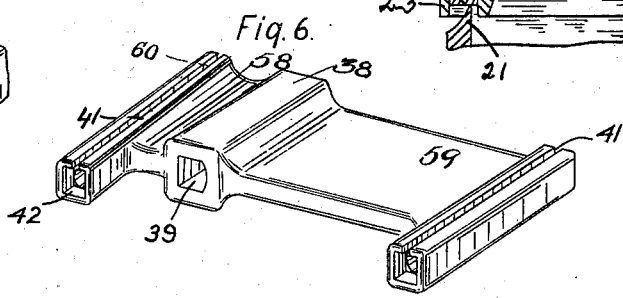
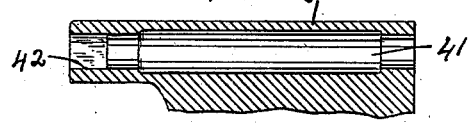
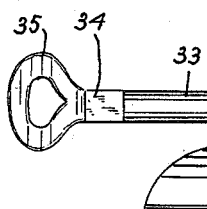
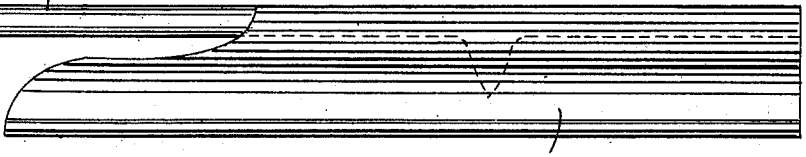
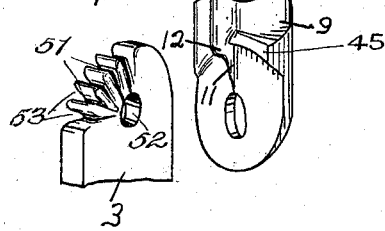
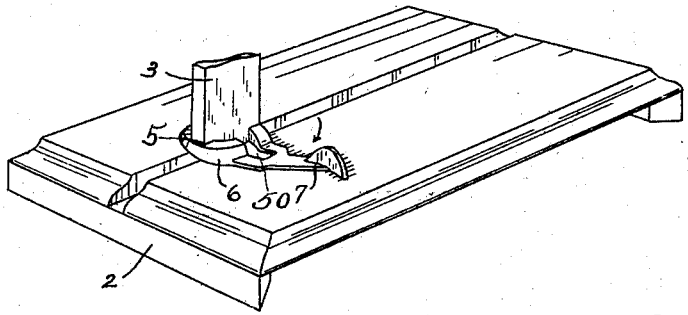
Witnesses
R. D. Hawkins
Zula Green
Inventor
Josiah P. Perkins
By V H Lockwood
His Attorney
THE NORRIS PETERS CO., PHOTO-LITHO., WASHINGTON, D. C.

UNITED STATES PATENT OFFICE.

JOSIAH P. PERKINS, OF INDIANAPOLIS, INDIANA.

ICE-CREAM FREEZER.

SPECIFICATION forming part of Letters Patent No. 637,893, dated November 28, 1899.

Application filed November 10, 1897. Serial No. 658,669. (No model.)

*To all whom it may concern:*

Be it known that I, JOSIAH P. PERKINS, of Indianapolis, county of Marion, and State of Indiana, have invented a certain new and useful Ice-Cream Freezer; and I do hereby declare that the following is a full, clear, and exact description thereof, reference being had to the accompanying drawings, in which like numerals refer to like parts.

This invention relates to an ice-cream freezer whereby the whole body of cream and ice is rotated about a stationary stem on which a suitable scraper and worker are mounted. The purposes of this kind of ice-cream freezer are substantially fourfold—first, to freeze a large or small body of cream quickly; second, to very thoroughly mix and work the cream in the process of freezing; third, to cause great economy in the amount of ice or freezing material used, and, fourth, to render the freezer easy to operate.

The features of the invention relate to the means for removably securing the freezer to a suitable base; to the means shown for adjusting the angle of the stationary stem extending into the freezer and securing it in place; to reducing the size of the stem or of the internal diameter of the sleeve surrounding the stem and to which the vessels of the freezer are secured, so that the bearing will be limited to particular points; to the means for making a water-tight joint between the outer vessel and the sleeve through which the supporting-stem extends; to the means for adjustably holding the worker and scraper in place; to the form of the scraper, and especially its outer edge that contacts with the cream-can; to the means provided for closing and opening the ice-receptacle for the admission of ice; to the means shown for distributing the ice in the receptacle while in operation, and to other features that will more fully appear from the accompanying drawings, and the description and claims following.

In the drawings, Figure 1 is a section through the ice-cream freezer on the line 1 1 of Fig. 2. Fig. 2 is a plan view with the lids removed. Fig. 3 is an enlarged detail of the contacting edge of the scraper with the cream-can. Fig. 4 is a central section through the central portion of the lid of the cream-can. Fig. 5 is a central cross-section through the lid and parts surrounding the opening into the ice-receptacle. Fig. 6 is a perspective of the bracket that carries the worker and scraper. Fig. 7 is a central longitudinal section through one end of the bracket shown in Fig. 6. Fig. 8 is a detail view of the scraper. Fig. 9 is a detail view of the parts that form the joint between the supporting-stem and base, the parts being broken away and being somewhat separated. Fig. 10 is a perspective of the base. Fig. 11 is a detail showing the manner of inserting the worker in its support.

In detail a base is made comprising two boards 1, secured parallel to each other on cross-pieces 2, so as to leave between the boards an opening, as seen in Fig. 10. Through this opening a supporting-standard 3 extends vertically, with a horizontal head 4 at its lower end, and under the boards 1. The purpose of this head is to prevent the escape of the standard 3 upward through the opening between the boards 1. In opposite edges of the standard 3 a notch at 5 is made, so as to provide shoulders. For clamping the standard 3 in position I employ a cam-ring 6, with a finger-piece 7 for turning it. On two opposite sides of such ring-cam elevated surfaces are provided, as seen in Figs. 1 and 10. By rotating the ring 6 in the direction indicated by the arrow in Fig. 10 it is clear that the cam-surfaces will press upward against the shoulders of the standard 3, and thus clamp the head 4 tightly against the bottom of the boards 1 and rigidly secure the standard 3 in place. It can be shifted to any point in the opening through which it extends by turning the ring 6 in the direction opposite to that above mentioned until the clamping of the head 4 ceases. Then the standard 3 can be slipped laterally to the desired position and can be clamped in place. The ring is removed from the standard by means of a recess 50 in one side of the ring, which permits the ring to pass over the standard when the ring is so turned as to permit it.

The stem 8 has at its lower end a right-angled arm 9, which is secured to the standard 3 by a joint that permits the pitch of the stem 8 to be altered. The upper end of the standard 3 is on one side provided with a series of grooves 51, extending radially from a hole 52 in it, through which the bolt 10 extends. The outer portion of these radial grooves are deepened to form notches 53 on the periphery of the upper end of the standard 3. For this purpose such upper end is curved. On the inside of the lower end of the arm 9, to which the stem 8 is secured, I provide an inclined rib 11 of a suitable size to fit snugly in the radial grooves in the standard 3. The outer end of such rib 11 is enlarged to form the tooth 12, that extends still farther away from the inner face of the arm 9, so as to engage the notches in the periphery of the upper end of the standard 3. When the arm 9 is adjusted to the proper position, it is drawn into engagement and locked with the upper end of the standard 3 by the bolt 10 and nut 13. In such case the rib 11 and tooth 12 fit in one of the radial grooves and notches in the upper end of the standard 3. Thus the position of the stem 8 is rigidly secured.

The hole in the lower end of the arm 9, through which the bolt 10 extends, is elongated, as shown in Fig. 9, so that such arm can be elevated when the bolt is slightly loosened to permit the tooth 12 to be set in any other notch. To alter the inclination of the stem 8, the nut 13 is released sufficient to enable one to draw or elevate the arm 9 so as to set the rib 11 and tooth 12 into another groove or notch in the upper end of the standard 3. Then the parts are again clamped together. The tooth 12, fitting in one of the notches on the periphery of the upper end of the standard 3, absolutely prevents the arm 9 from turning however great the weight or pressure of the stem 8 may become. This is important also to hold the freezer up in position when the joint is not tightly clamped. A stop-lug 45 is placed on the arm 9 to engage the standard 3 and prevent the freezer from being thrown too far backward. It is arranged here, and should be arranged so that the stem 8 would stop short of a vertical position.

With this kind of freezer it is desirable that the cans or receptacles be in a position while the cream is being frozen that is inclined almost to a horizontal position, preferably in the position shown in Fig. 1. This is to cause the freezing material to come in contact with the cream-can from bottom to top by the rotation of the freezer, so that the cream will be frozen throughout the whole surface of the can containing it.

The stem 8 is reduced in size a short distance from its lower end to form an enlarged bearing-place 55 for the lower end of the bearing-sleeve 14. At the upper end I contract the opening through the sleeve 14, so as to have a bearing 56 there also. The purpose is to have a bearing at certain points instead of having it throughout the whole length of the stem and sleeve.

The ice-receptacle 15 and the cream-can 16 are secured together, so that they will rotate together. They are secured to the sleeve 14 by water-tight joints, the cream-can 16 being made of tin and preferably soldered or otherwise secured to the annular shoulder 17 on the sleeve 14. The ice-receptacle is made of wood, in the form of an ordinary wooden pail. Its bottom is centrally apertured to receive the sleeve 14, whose lower end is externally-threaded, and immediately above the threads is provided with an annular collar 18, beveled or curved on the side adjacent to the bottom of the pail or ice-receptacle 15. A nut 19 is screwed on the lower end of the sleeve 14 and up against the bottom of the ice-receptacle. The surface of this nut adjacent to the bottom of the ice-receptacle is likewise curved or beveled, substantially as shown, so that the bottom of the ice-receptacle can be clamped and compressed between the two oppositely curved or beveled surfaces of the collar 18 and nut 19, whereby an absolutely water-tight joint is obtained without difficulty. One purpose of this construction is to enable me to set the upper ends of all parts of the freezer in the desired relative positions, especially to center the sleeve 14 in the cream-can.

The sleeve 14 holds the cream-can 16 and ice-receptacle 15 in position at their lower ends, while at their upper ends they are held in proper relative position by the top 20 of the ice-receptacle. This is secured to the cream-can and also to the ice-receptacle so as to be preferably water-tight. An opening 57 is made in such top 20 for the purpose of inserting the ice, as seen in Fig. 2. The edge of the flange 21, surrounding said opening, is somewhat sharpened in the shape of the letter A in cross-section, as seen in Fig. 5. The lid 22 is provided with two downwardly-extending flanges 23 and 24 a slight distance apart. Between these flanges I place a rubber gasket or cushion 25. The dimensions of the lid and position of the flanges and gasket are such that when the lid is put in place the gasket will rest on the edge 21 about the opening into the ice-receptacle. On each side of the opening I secure a pin 26, on which I pivot fasteners 27, extending horizontally from the pin. These fasteners engage inclined surfaces 28 on the lid. By this the lid can be easily clamped down so as to be absolutely water-tight. A knob 29 is so mounted on the lid or elsewhere as to be rotatable. The ice-receptacle and cream-can are rotated by hand applied to said knob.

In order to distribute the ice and carry the lumps of ice toward the upper end instead of permitting it to settle and remain only in the lower portions, I provide a distributer comprising a series of pins 30, secured some distance apart to the bar 31, that is fastened to the interior of the ice-receptacle in an oblique position and substantially as shown. It may, if desired, be secured instead to the cream-can. As the freezer is rotated this distributer will cause the lumps of ice to be gradually carried toward the upper end, while gravity will tend to cause the lumps of ice to settle toward the lower end. The water and small particles of ice escape through this distributer. One effect of this is to accelerate the melting of the ice by the friction it causes.

In view of the fact that the cream-can rotates the worker and the scraper therein are stationary. I provide what I call a "scraper" 32, curved away from the center scoop-like toward the shell of the cream-can, substantially as shown in Figs. 2 and 3. The outer edge of such scraper is rounded or curved, substantially as shown in Fig. 3, to prevent it cutting the tin of the cream-can. Also to avoid this consequence and to make it operate more easily the curvature of the scraper near its outer edge is substantially parallel with the curvature of the cream-can. Both of these features are of great importance. The scraper is a curved plate of tin or metal secured to the shank 33, that is round, preferably, excepting at its bearing-point 34, which is preferably flat, and at its upper end it is provided with a handle or finger-piece 35. The worker 36 is likewise a scoop-like curved plate that is considerably wider than the scraper, and it is mounted in the same manner. To strengthen the scraper and worker, I provide a reinforcing-rib 37. The only differences in the mounting of the scraper and worker are that the worker is mounted as close to the center of the cream-can as possible, while the scraper is mounted as far away from the center as is convenient and practical, and the worker is so mounted that it extends at a slight angle to the axis or center of the cream-can. It extends somewhat obliquely, so that it will tend in its operation to force the cream down toward the lower end. The extent of the variation from the axis of the cream-can, however, to accomplish this result is not very great, although it is of great importance and must be provided for in order to properly mix and work the cream.

Both the worker and scraper are mounted in and supported by the bracket 38, which is provided at 39 with an aperture that fits on the upper end of the stem 8 and is held in place against the sleeve 14 by the key 40. Said aperture at 39 as well as the upper end of the stem 8 are shown with one of the four sides of each rounded. The purpose of this is to prevent the bracket being placed in any other position than that shown in Fig. 2—that is, with its two arms extending laterally. Any other manner of providing for this arrangement would suffice. The advantages of it will hereinafter appear. This bracket has two arms—a short one, 58, for the worker and a long one, 59, for the scraper. At the outer ends of said arm 58 a groove or socket at 41 is provided, which extends at a slight angle with the axis of the cream-can, as is seen in Fig. 6. This socket is provided with a longitudinal slot 60 and receives the shank 33 of the worker or scraper. The socket 41 in the arm 59 is parallel with the axis of the cream-can. The opening of the socket is sufficiently wide to permit the passage of the scraper or worker. The scraper or worker is put in place by first inserting the lower end of the shank in the upper end of the socket 41, as seen in Fig. 11. At the upper end the socket 41 is square to receive or furnish a seat for the square portion 34 of the shank 33. The rounded portion of the shank 33 between such squared portion 34 and the scraper or worker is long enough and small enough to permit one to rotate or turn the worker or scraper in its support by slightly elevating the same enough to remove the square portion 34 up out of its seat 42. In this manner the position of the scraper and worker is adjusted, there being four positions in which each may be placed by reason of the fact of the square 34 and the square seat 42 having four sides. However, only two positions are usually needed—one with the scraper and worker in engagement with the cream-can and one with them out of engagement. The slot 41 is contracted near its ends, as seen in Fig. 7, to furnish bearing-surfaces for the shank 33.

Attention is called to the fact that the worker as well as the scraper are by the construction heretofore described readily and completely removable, so that they can be used by themselves for any purpose. For example, in the actual operation of the device the worker, which is in the form of a scoop, somewhat like a sugar-scoop, is used to put the ice and salt into the ice-receptacle of the freezer, and also the worker or scraper, or both, are in nearly all cases used to remove the cream from the cream-can after it is frozen.

The lid 43 is provided for the cream-can and has a handle 44 centrally pivoted to it, so as to turn, and on the inner end of the pivot-bolt of the handle a small disk 46 is secured rigidly, so as to turn with the handle, as seen in Figs. 1 and 4. One or more holes are made in this disk and also in the lid 43 in such position that when the handle 44 is rotated these holes will at times register with each other. The purpose of this is to combine with the construction of the lid and handle means for ventilating the cream-can.

It is thus seen that I have a strong construction whereby ice-cream may be easily made in small or large quantities in a very short time and be very thoroughly worked with the use of a very small quantity of ice or other freezing material. When it is not in use, whether it is for the purpose of shipment or storage or otherwise, the freezer can be readily turned down upon the base, so as to occupy little room. When it is to be used, it can be readily elevated to any desired angle or pitch and its support shifted to any part of the base. The ice-receptacle is air and water tight, and while in operation the ice is kept in constant and equal contact with the various parts of the surface of the cream-can.

The scraper removes the cream from the inner surface of the cream-can as rapidly as it is frozen, and it does so without cutting or scratching such inner surface or causing any friction. The scraper works the material away from the surface of the cream-can toward the center and the worker pushes the material away from the center toward the surface.

As has been stated, in the operation of the machine the worker and scraper will be in the position shown in Fig. 2—that is, with their edges turned upward. The cream as it is scraped off by the scraper falls downward between the scraper and the sleeve 14 into the portion of the cream-can there shown below the worker and scraper. The cream scraped off by the scraper drops down through the opening into the unfrozen cream, which is well mixed by the worker and scraper, and is picked up by the wall of the cream-can little by little as the can is rotated and is rolled and passed between the worker and can. Part of it adheres to the can, is again scraped off, and the same process is repeated and continued until the cream is worked and frozen as dry as desired.

Attention is called to the fact that the scraper above referred to is a worker as well as a scraper, its chief function being to scrape off the cream, but an incidental function being to serve also as a worker.

The function of the movable joint between the standard 3 and the base 1 is to permit the freezer to be shifted on the base when the inclination of the freezer is changed, so that it will not tip over, and especially to have a steady reliable support for the freezer in any position.

What I claim as my invention, and desire to secure by Letters Patent, is—

1. An ice-cream freezer including a wooden ice-receptacle, a sleeve extending centrally through its bottom with an annular collar beveled on the side adjacent to the bottom of the ice-receptacle, and a nut that is secured on said sleeve adjacent to the other side of the bottom of the receptacle, whereby the bottom of the receptacle is clamped between the nut and the rounded face of the collar.

2. An ice-cream freezer including a cream-can, an ice-receptacle, a sleeve extending centrally through said cream-can and ice-receptacle to secure them together, the said sleeve being externally threaded at the end which passes through the bottom of the ice-receptacle and having an annular collar beveled or rounded on the side next to the threads and a nut screwed upon the threaded end of said sleeve and having its inner face beveled or rounded for clamping the bottom of the ice-receptacle tightly against the collar on said sleeve.

3. An ice-cream freezer including a base with a standard thereon curved at its upper end and having peripheral notches therein, a supporting-arm for the freezer having on its lower end a radial tooth to engage the notches, and a bolt for drawing and clamping the standard and arm together.

4. An ice-cream freezer including a base with a suitable standard rounded at its upper end and having radial grooves on one side thereof and notches in its periphery, an arm to support the freezer having a radial rib on one side to engage the grooves in the standard and a tooth to engage the notches in the standard, and a bolt for drawing and clamping the standard and arm together.

5. An ice-cream freezer including a suitable freezing vessel, a standard, means for pivotally securing the freezing vessel to the standard in a series of tilted positions, a base, means for mounting the standard on said base and said standard being laterally adjustable on said base whereby the overturning of the device is prevented when the freezer is tilted in position.

6. An ice-cream freezer including a suitable freezing vessel, a base having in it a slot, a standard extending through said slot with a head below the base and shoulders above the base, a cam-ring around said standard below its shoulders and above the base whereby the standard can be clamped to said base where desired, and means for pivotally securing the freezing vessel to the standard in a series of tilting positions, whereby the overturning of the device is prevented when the freezer is tilted.

7. An ice-cream freezer including an ice-receptacle, a cream-can, means for securing them together, and an ice-distributer mounted in the freezing-chamber consisting of a series of pins or teeth placed in a row at an angle to the axis of the ice-receptacle.

8. An ice-cream freezer including a suitable base, a stem therefrom adapted to be held in an inclined position and being enlarged at its lower end to form a bearing, a sleeve to fit on said stem with a contracted inner bearing-surface at its upper end, and suitable vessels secured to said sleeves.

9. An ice-cream freezer including a worker secured to a shank having a finger-piece or handle at its upper end, a square portion below and a round portion between the square portion of the shank and the worker, and a support for the worker provided with a slotted socket whose length is less than the length of the portion of the shank between the worker and the square part thereof and through which the shank and worker may be inserted the upper end of such socket being square to furnish a seat for the square portion of the shank.

10. An ice-cream freezer including a worker secured to a shank having a finger-piece or handle at its upper end, a square portion below and a round portion between the square portion of the shank and worker, and a support for the worker with a slotted socket whose length is less than the length of the portion of the shank between the worker and the square part thereof and through which the shank and worker may be inserted, the upper end of such socket being square to furnish a seat for the square portion of the shank, the slot in the support being contracted near its ends to furnish bearings for said shank.

In witness whereof I have hereunto set my hand this 22d day of October, 1897.

JOSIAH P. PERKINS.

Witnesses:
V. H. LOCKWOOD,
ZULA GREEN.